United States Patent [19]

Landaus

[11] 4,121,372
[45] Oct. 24, 1978

[54] INSECT TRAPS
[75] Inventor: Lionel Ricardo Landaus, Queenstown, New Zealand
[73] Assignee: Kenneth James Landaus, Christchurch, New Zealand
[21] Appl. No.: 794,093
[22] Filed: May 5, 1977
[30] Foreign Application Priority Data
Sep. 28, 1976 [GB] United Kingdom ............... 40171/76
[51] Int. Cl.² ............................................. A01M 1/02
[52] U.S. Cl. .................................................. 43/122
[58] Field of Search .......................... 43/107, 118, 122
[56] References Cited
U.S. PATENT DOCUMENTS

| 1,102,642 | 7/1914 | Brown | 43/122 |
| 1,497,800 | 6/1924 | Smith | 43/122 |
| 1,715,958 | 6/1929 | Strand | 43/122 |
| 2,478,104 | 8/1949 | Johnson | 43/122 |
| 2,786,298 | 3/1957 | Smith | 43/118 |

FOREIGN PATENT DOCUMENTS 587,733  5/1947  United Kingdom ...................... 43/122

OTHER PUBLICATIONS

Popular Mechanics–Chicago Shop Notes, vol. 32, p. 92, Jan. 1936.

Primary Examiner—William Pieprz
Attorney, Agent, or Firm—Plumley and Tyner

[57] ABSTRACT

A fly trap has a bait jar surmounted by an entry chamber which has a number of scent dispersal holes and a number of insect entry holes. The entry chamber communicates with and is surmounted by a tunnel the far end of which is partly closed so as to allow insects to pass from the entry chamber and out of the tunnel into a fly collection chamber which is surrounded by a translucent disposable container.

4 Claims, 3 Drawing Figures

INSECT TRAPS

BACKGROUND OF THE INVENTION

This invention relates to insect traps and in particular to a fly trap having a disposable fly collection chamber. Fly traps are known which include a base into which is placed a lure and above the base is mounted a trapping container so that flies will be lured into the trapping container and will then pass from the container into a fly collection chamber which is mounted above the trapping container. Such fly collection chambers are generally arranged so that they can be simply removed from the fly trap for disposal of the dead insects.

One of the difficulties associated with such fly traps is to ensure ready access of flies into the trap and to ensure that once a fly is in the trap it can neither contaminate the lure nor leave the trap but must inevitably enter the fly collection chamber.

Previously known fly traps have been constructed from various types of material which necessitates the co-relation of various manufactures. This can result in difficulty being experienced in assembling the fly traps which is usually reflected in an adverse cost structure of the fly trap.

SUMMARY OF THE INVENTION

In accordance with the present invention the fly trap includes a bait jar which is surmounted by an entry chamber which has an outside wall of generally circular shape in cross section. The diameter of the outside wall of the entry chamber adjacent the bait jar is greater than the diameter of the mouth of the bait jar to form an umbrella over the bait jar. The entry chamber includes a first annular member which is substantially the same diameter as the mouth of the bait jar and which has a plurality of scent dispersal holes so that the scent of the lure can pass from inside the bait jar to outside the fly trap. The entry chamber also includes a second annular member which extends upwardly and outwardly from the said first annular member and which is joined to the inside of the entry chamber so as to form a continuous seal between the mouth of the bait jar and the inside of the entry chamber. The second annular member includes a plurality of insect entry holes which communicate the interior of the said entry chamber with the exterior of the fly trap. The entry chamber is surmounted by and communicates with one end of a tunnel, the other end of which has a closure member which includes an opening to allow the passage of insects from the entry chamber through the tunnel and through the opening in the closure member into a fly collection chamber formed exteriorily of the tunnel by a translucent disposable container which is supported by the said tunnel.

BRIEF DESCRIPTION OF THE DRAWING

In the attached drawing

DETAILED DESCRIPTION OF THE INVENTION

Figure 1:
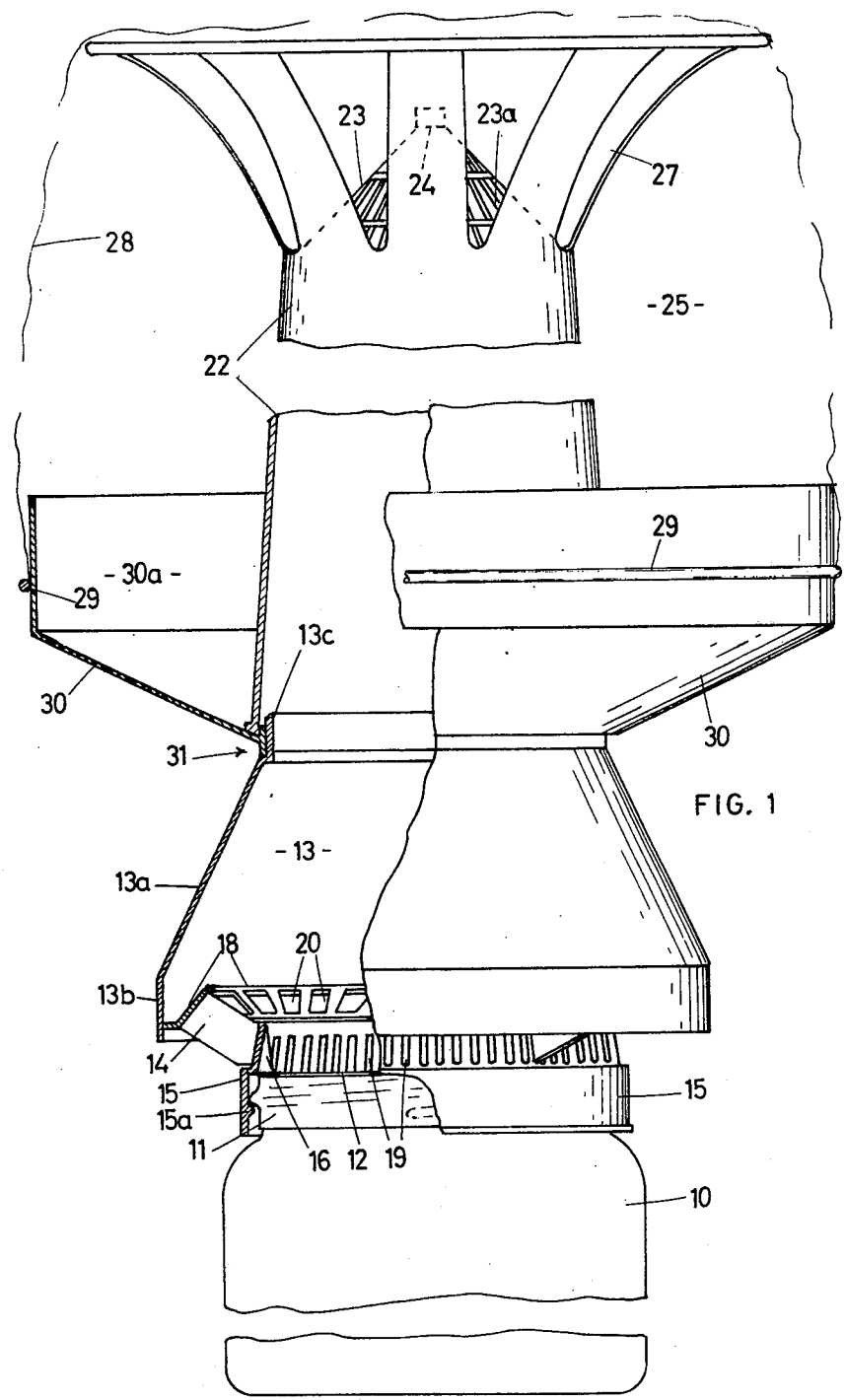
FIG. 1 is a view of the fly trap shown partly in full and partly broken away to show the interior of the trap.

FIG. 1 illustrates a fly trap having a bait jar 10 which is formed preferably of glass and which has a screw top open mouth 11. The bait jar 10 is utilized to receive the lure (not shown in the drawings) which may be for instance fish, poultry gut, chopped liver and so forth to which is added a suitable amount of lure fluid as is known in the art. The open mouth 11 of the bait jar 10 is covered by a gauze 12 of suitable non-corrodible material to allow the scent from the bait to permeate through the gauze but to prevent flies which enter the container as will be hereinafter described from contacting the lure or lure fluid.

An entry chamber 13 is arranged to surmount the bait jar, this chamber being preferably formed from an injection moulded plastics material and having an outside wall 13a which is frustro-conical in shape, with the base 13b of the entry chamber being of greater diameter than the mouth of the bait jar. A first annular member 15 has a portion of its interior formed as at 15a so that the ring like member may be screwed onto the screw topped open mouth 11 of the bait jar 10. A plurality of ledges 16 are shaped so that when the annular member 15 is screwed onto the bait jar, the underside of the ledges will bear against the gauze 12 which has first been placed on top of the bait jar 10 so as to bear down on the gauze and retain it in place.

A second annular member 18 is formed so as to be a part of the base 13b and extends between the base and the first annular member 15. A plurality of webs 14 extend radially inwardly from the underside of the second annular member 18 and are joined to the wall of the first annular member 15, the webs being present to provide additional rigidity to the structure.

Normally the first annular member 15, the second annular member 18 and the webs 14 will be simultaneously formed.

The first annular member 15 extends upwardly from the bait jar and has a number of scent dispersal holes 19 formed therein so that the scent of the lure rising out of the bait jar and through the gauze 12 can disperse outside the fly trap through the scent dispersal holes 19. The second annular member 18 extends upwardly and outwardly from the top of the first annular member 15 and is provided with a number of insect entry holes 20 which are of a size and shape that will allow an insect to enter the entry chamber 13 but not to return out of the holes. Thus the combination of the entry chamber 13 and the first and second annular members 15 and 18 form a seal on the top of the bait jar 10 which allows the scent of the lure to be dispersed outside the fly trap and which allows flies to enter into the entry chamber 13. As can be seen from the drawing the base 13b of the entry chamber is of greater diameter than that of the bait jar and extends downwardly partly over the first annular member so as to form an umbrella over the first and second annular members and over the bait jar to assist in weather protection.

A tunnel 22 which is also preferably formed from an injection moulded plastics material is fitted to the top of the entry chamber, this tunnel being hollow and preferably tapered from the entry chamber towards the other end i.e. the exit end of the tunnel. The exit end of the tunnel is closed by a closure member 23 which may also be formed of a plastics material and which includes an opening 24 of a sufficient size that insects which enter the tunnel from the entry chamber can pass up through the tunnel and through the opening 24 into a fly collection chamber 25 exterior of the said tunnel 22. The closure member 23 also preferably includes a number of additional small holes 23a that will allow light to enter the tunnel but will not allow passage of insects therethrough. Thus insects which enter the entry chamber 13 will be attracted by the light at the far end of the tunnel and proceed through the tunnel and out through the opening 24 in the closure member 23 into the insect collection chamber 25.

A rose circle 27 surmounts the upper end of the tunnel 22 and is shaped so that a bag like translucent disposable container 28 can be draped over the rose circle and thus in effect be supported by but spaced from the tunnel 22. The disposable container 28 will in use be draped over the rose circle 27 and the normally open end of the disposable container is sealed by a tie-band 29 which is positioned around an annular portion 30 of the fly trap which is shaped as an inverted cone and which is fixed to or moulded so as to extend outwardly from the aforesaid tunnel 22. The interior 30a of the portion 30 will thus form a well for the dead insects.

The entry chamber 13 together with the first annular member 15 and second annular member 18 will generally be moulded as one single unit. The tunnel 22 together with the rose circle 27 may also be moulded as a single unit as indicated in the drawings or the rose circle may be formed as a separate unit and spigoted to the top of the tunnel. To assemble the fly trap after manufacture, the portion 30 is passed over the annular lip 13c of the entry chamber 13 and the lower end of the tunnel 22 is then spigoted over the joint 31 so formed. Suitable adhesive can then be utilized to ensure that the parts remain as an integral unit.

In use an appropriate lure and lure fluid as hereinbefore referred to is placed within the bait jar 10 and the bait jar is then attached to the first annular member 15 after ensuring that the gauze 12 is in place. The scent from the bait will disperse out of the scent dispersal holes 19 and will attract flies and other insects which can then enter the entry chamber 13 through the entry apertures 20. The flies are prevented from contacting the lure and lure fluid by reason of the gauze and will be attracted to the top of the tunnel 22 by light entering through the holes 23a and through the opening 24 at the top of the closure member 23. The flies can then pass through the opening 24 and into the fly collection chamber 25 but will not normally re-enter the interior of the tunnel 22 because of the comparative darkness of the interior of the tunnel. The flies will thus after a period of time become exhausted and overcome by asphyxia and will fall and die in the well 30a of the portion 30. To dispose of the dead insects in the trap, the bait jar is unscrewed from the fly trap and the fly trap is then inverted so that the dead insects will fall into the area of the bag adjacent the rose circle. The tie-band 29 can then be removed and the container 28 slipped off the fly trap and be disposed of together with the trapped flies therein.

What is claimed is:

1. A fly trap including a bait jar surmounted by an entry chamber having a wall of generally circular shape in cross section wherein the diameter of the said wall of the entry chamber adjacent the bait jar is greater than the diameter of the mouth of the bait jar and wherein the said entry chamber includes a first annular member which includes a plurality of scent dispersal holes and which is of substantially the same diameter as the said mouth of the bait jar to which it is attachable by screw threads and which includes means for retaining a sheet of gauze to cover said mouth, the said entry chamber also including a second annular member which extends upwardly and outwardly from the said first annular member and which includes a plurality of insect entry holes which communicate the interior of the said entry chamber with the exterior of the fly trap, and wherein the entry chamber is surmounted by and communicates with one end of a tunnel, the other end of which has a closure member which includes an opening to allow the passage of insects therethrough and into a fly collection chamber formed exteriorily of the tunnel by a translucent disposable container which is supported by the said tunnel.

2. The fly trap as claimed in claim 1 wherein the said translucent disposable container is supported on a rose circle above the said tunnel and wherein the said container has a mouth which is sealed around an annular extension to the tunnel.

3. The fly trap as claimed in claim 2 wherein the said annular extension to the tunnel forms a well.

4. The fly trap as claimed in claim 1 wherein the said closure member is also provided with a plurality of holes to admit light to the interior of said tunnel.

* * * * *